(12) United States Patent  
Zagaja et al.

(10) Patent No.: US 6,659,049 B2
(45) Date of Patent: Dec. 9, 2003

(54) HYDROGEN GENERATION APPARATUS FOR INTERNAL COMBUSTION ENGINES AND METHOD THEREOF

(75) Inventors: John Zagaja, East Granby, CT (US); Trent Molter, Glastonbury, CT (US); Lawrence Moulthrop, Windsor, CT (US); William Smith, Suffield, CT (US)

(73) Assignee: Proton Energy Systems, Wallingford, CT (US)

( * ) Notice: Subject to any disclaimer, the term of this patent is extended or adjusted under 35 U.S.C. 154(b) by 57 days.

(21) Appl. No.: 10/081,666

(22) Filed: Feb. 22, 2002

(65) Prior Publication Data

US 2003/0159663 A1 Aug. 28, 2003

(51) Int. Cl.$^7$ ................................................ F02B 43/08
(52) U.S. Cl. .......................................................... 123/3
(58) Field of Search ...................... 123/3, 1 A, DIG. 12

(56) References Cited

U.S. PATENT DOCUMENTS

| | | | |
|---|---|---|---|
| 3,311,097 A | 3/1967 | Mittelstaedt | 123/119 |
| 3,647,394 A * | 3/1972 | Wetch et al. | 422/112 |
| 4,112,875 A * | 9/1978 | Fletcher et al. | 123/1 A |
| 4,415,278 A * | 11/1983 | Szonntagh | 374/37 |
| 5,105,773 A | 4/1992 | Cunningham et al. | 123/3 |
| 5,143,025 A | 9/1992 | Munday | 123/3 |
| 5,293,857 A | 3/1994 | Meyer | 123/571 |
| 5,452,688 A | 9/1995 | Rose | 123/3 |
| 5,658,449 A | 8/1997 | Benz et al. | 205/637 |
| 5,678,403 A | 10/1997 | Kanehara et al. | 60/309 |
| 5,813,222 A | 9/1998 | Appleby | 60/274 |
| 5,964,089 A | 10/1999 | Murphy et al. | 60/286 |
| 6,119,651 A | 9/2000 | Anderson | 123/297 |
| 6,122,909 A | 9/2000 | Murphy et al. | 60/286 |
| 6,235,254 B1 | 5/2001 | Murphy et al. | 423/212 |
| 6,257,175 B1 | 7/2001 | Mosher et al. | 123/3 |
| 6,314,732 B1 * | 11/2001 | Lookholder | 60/597 |
| 6,383,361 B1 * | 5/2002 | Moulthrop et al. | 205/628 |
| 6,427,639 B1 * | 8/2002 | Andrews et al. | 123/3 |
| 6,458,478 B1 * | 10/2002 | Wang et al. | 429/17 |
| 6,464,854 B2 | 10/2002 | Andrews et al. | 205/628 |
| 2002/0117124 A1 | 8/2002 | McMaster et al. | 123/3 |

FOREIGN PATENT DOCUMENTS

WO     WO 00/23638     4/2000

OTHER PUBLICATIONS

Z. Dulger, K.R. Ozcelik "Fuel Economy Improvement by on Board Electrolytic Hydrogen Production", Int. J of Hydrogen Energy v25 (2000) 895–897.

* cited by examiner

Primary Examiner—Henry C. Yuen
Assistant Examiner—Hyder Ali
(74) Attorney, Agent, or Firm—Dave S. Christensen

(57) ABSTRACT

A system and method are provided for generating hydrogen for use with an internal combustion engine. The system includes a venturi device coupled with an exhaust stream from the internal combustion engine. The venturi device creates a gas flow through a condenser to generate reactant water. After the reactant water is polished to remove contaminants, hydrogen and oxygen are disassociated using a PEM based electrolyzer. The hydrogen gas is used by the internal combustion engine to assist in the combustion process and reduce pollutant emissions.

52 Claims, 2 Drawing Sheets

HYDROGEN GENERATION APPARATUS FOR INTERNAL COMBUSTION ENGINES AND METHOD THEREOF

FIELD OF THE INVENTION

This disclosure relates generally to the generation of hydrogen utilizing exhaust from and internal combustion engine, and especially relates to the use of electrolysis of water for the generation of the hydrogen.

BRIEF DESCRIPTION OF THE RELATED ART

A typical internal combustion engine such as that generally used in automobiles, trucks and other vehicles use hydrocarbon fuels for combustion. Since a portion of the hydrocarbon fuel remains unburned as the exhaust exits the engine, pollutants are generated and released to the environment. A number of attempts have been made to increase the efficiency and completeness of combustion by utilizing catalysts and additives which decrease the quantity of pollutants post-combustion in the exhaust.

One additive used is the introduction of gaseous hydrogen into the fuel mixture before combustion. When mixed and combusted with the hydrocarbon fuel, the gaseous hydrogen enhances the flame velocity and permits the engine to operate with leaner fuel mixtures. Thus, hydrogen has a catalytic effect causing a more complete burn of the existing fuel and yields a reduction in exhaust emissions.

Due to the advantages of hydrogen in reducing the exhaust emissions, a number of attempts have been made to incorporate a system with vehicles. Unfortunately, gaseous hydrogen is not readily available to the general public. To overcome this lack of availability, systems using an electrochemical cells have been proposed to provide the necessary hydrogen.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104, and a portion of the process water 108, exit cell 100, while protons 106 and water 110 migrate across a proton exchange membrane 118 to cathode 114 where hydrogen gas 112 is formed. The hydrogen gas 112 and the migrated water 110 exit cell 100 from the cathode side of the cell 100.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane, while oxygen gas saturated with water vapor exits the cell at the anode side.

In vehicle applications, it is necessary provide a water source to generate the hydrogen. Prior art solutions incorporate a water reservoir that must be periodically replenished. The disadvantage of this solution is that it adds an additional maintenance procedure for the engine operator.

What is needed in the art is a hydrogen generation system for use with an internal combustion engine that requires minimal maintanence and a method for use thereof.

SUMMARY OF THE INVENTION

Disclosed herein are hydrogen generation systems for use with internal combustion engines and methods for use thereof. An exemplary embodiment of the hydrogen generation system comprises: an exhaust venturi, a condenser in fluid communication with the venturi, the condenser extracting water from the exhaust stream and an electrolyzer in fluid communication with the condenser, the electrolyzer producing hydrogen gas.

Another embodiment of the hydrogen generation system comprises: an exhaust venturi, an air inlet in fluid communication with the venturi and ambient air, a condenser in fluid communication with the venturi and the air inlet, the condenser extracting water from the ambient air, and an electrolyzer in fluid communication with the condenser, the electrolyzer producing hydrogen gas.

One embodiment for an internal combustion engine comprises: an internal combustion engine, an exhaust pipe coupled to the internal combustion engine, a condenser in fluid communication with the exhaust pipe; and an electrolyzer in fluid communication with the condenser.

One embodiment for operating a hydrogen generation system for use with an internal combustion engine comprises: drawing exhaust gas from an exhaust pipe, condensating water from said exhaust gas, storing said water, and generating hydrogen from said water.

Another embodiment for operating a hydrogen generation system comprises: creating gas flow with a venturi, drawing ambient air into a condenser, condensing water from the ambient air, storing said water, and generating hydrogen from said water.

One embodiment for operating an internal combustion engine comprises: mixing hydrogen and hydrocarbon fuel, combusting the fuel mixture, exhausting the combusted mixture, creating gas flow with an exhaust venturi, drawing ambient air into a condenser, condensing water from the ambient air, storing said water, and generating hydrogen from said water.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DETAILED DESCRIPTION OF THE PREFERRED EMBODIMENTS

A wide variety of applications utilize internal combustion engines to convert hydrocarbon fuels, such as gasoline, diesel, natural gas and propane, into mechanical energy. These include transportation applications, such as automobiles, trucks and the like, and stationary applications such as electrical generators. The one problem these applications have in common is the pollution generated and released into the atmosphere. Pollutants are caused by unburned or incomplete burning of the hydrocarbon fuel in the internal combustion engine. One technique employed to reduce pollution emissions in the exhaust of the internal combustion engine includes the addition of additives such as hydrogen into the hydrocarbon fuel prior to combustion. The hydrogen increases the flame velocity of the fuel mixture during combustion resulting in less non-combusted hydrocarbon fuel in the exhaust stream.

Figure 2:
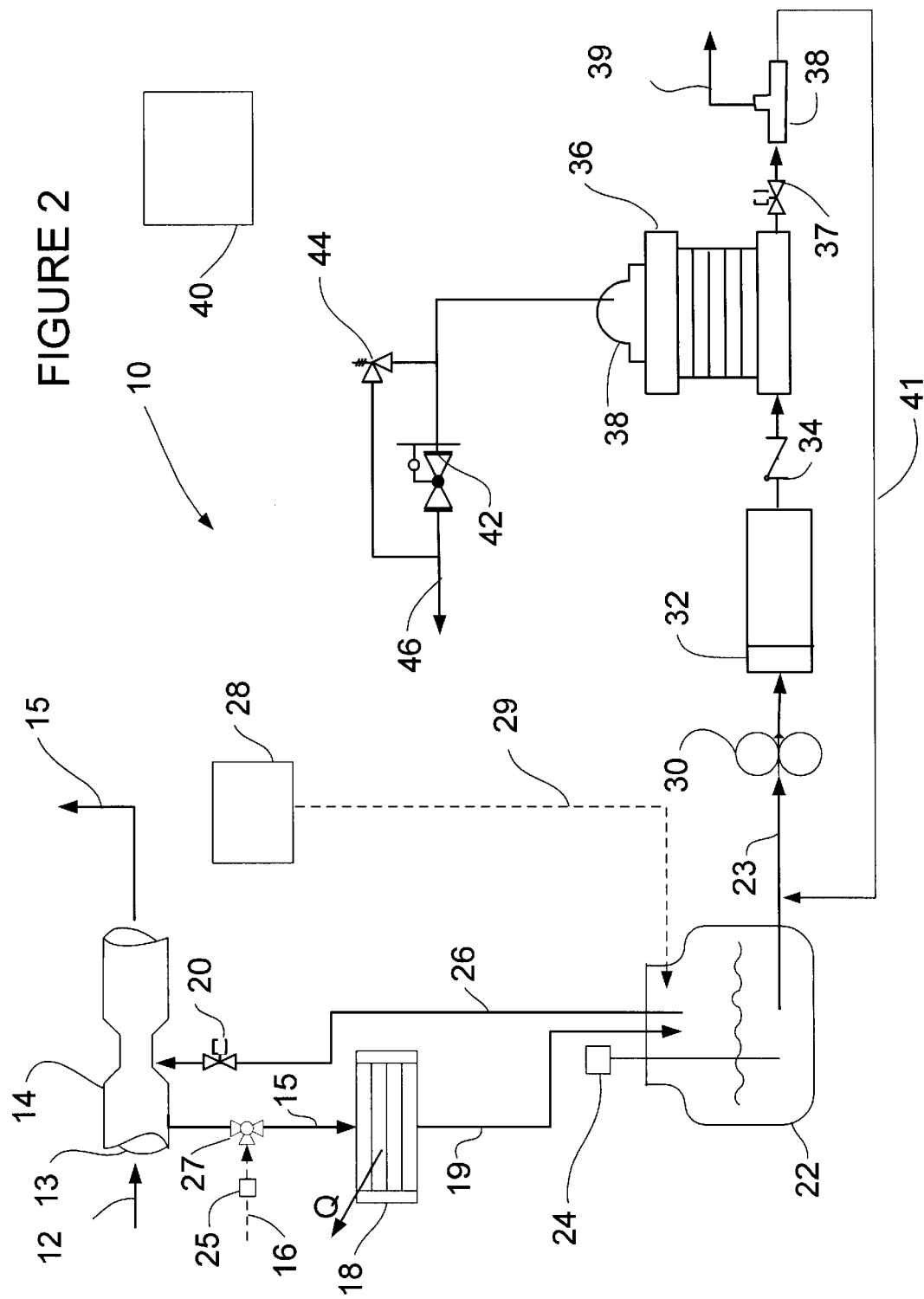

A system 10 for generating hydrogen gas for use with an internal combustion engine is shown in FIG. 2. An exhaust stream 12 from an internal combustion engine (not shown) is routed away from engine through an exhaust pipe 13 in a typical manner well known in the art. A venturi 14 is along the exhaust pipe 13. While the venturi 14 can be located anywhere along the length of the exhaust pipe 13, it is preferred that it is located downstream from a catalytic device (e.g. a catalytic converter) which removes many of the pollutant compounds from the exhaust stream 12. A tube 15 connects a condenser 18 with the exhaust pipe 13. For reasons that will be made clearer herein, it is preferred that the tube 15 be located upstream from the venturi 14. While engine exhaust alone could be used in the system, it is preferable to provide an air inlet 16 connected to the tube 15 to provide ambient air into the system 10. With the air inlet 16 connected, the system has the option of using ambient air or exhaust gas to generate reactant water. A sensor 25 such as a, dew point sensor, measures the properties of the ambient air. These properties may include ambient air temperature, relative humidity and/or dew point. The sensor 25 is connected to a control system 40 which determines which gas stream would require a minimal condenser energy. A valve 27 in response to the control system 40 will activate to allow either exhaust gas or ambient air into the system 10.

The condenser 18 removes heat Q from either the engine exhaust 12 or the ambient air causing water to condensate and collect in the reactant water reservoir 22 via line 19. The condenser 18 can be of any type capable of cooling the gas to a temperature to its dew point. Preferably, the condenser would be a conductive type cooler, such as a thermo-electro or liquid refrigerant cooler capable of removing at least 680 BTU/Hr of heat from the gas. Preferably the condenser has the capacity to remove 300 to 700 BTU/hr Other types of condensers may include, but are not limited to, convection type coolers such as a fan systems. Preferably, the liquid refrigerant system would be coupled a vehicle air conditioning system, or the internal combustion radiator. A return line 26 connects the reservoir 22 with the venturi 14 via a valve 20. It is preferred that the valve 20 be a solenoid valve that is actuated by a control system (not shown). A sensor 24 is also connected to the reservoir 22 to detect and provide feedback to the system on level of the water in the reservoir 22.

If desired, an optional reserve line 28 and reserve reservoir 28 may be included to provide a backup water source during brief periods where humidity condensate may be unavailable. To minimize the maintenance requirements of the reserve system, the reserve reservoir 28 may also perform as the storage reservoir for other devices associated with the application such as a windshield wiper or the engine radiator. If the associated devices require additional compounds, e.g. methanol, ethylene-glycol, or propylene-glycol to operate, additional reactant water polishing may be required to remove these compounds prior to use in the electrolysis process. The polishing may be accomplished by either a additional device, or by the polisher 32.

A pump 30 is connected to the reactant water reservoir 22 by drain line 23. The pump moves the water from the reservoir 22 to a water polisher 32. Any type of water polisher 32 known in the art may be used to remove contaminants from the the reactant water. Preferably, the polisher 32 will use a combination activated carbon/mixed resin ion exchange bed to remove any contaminants. After the reactant water is conditioned it moves through check valve 34 into the electrolyzer cell 36.

Figure 1:
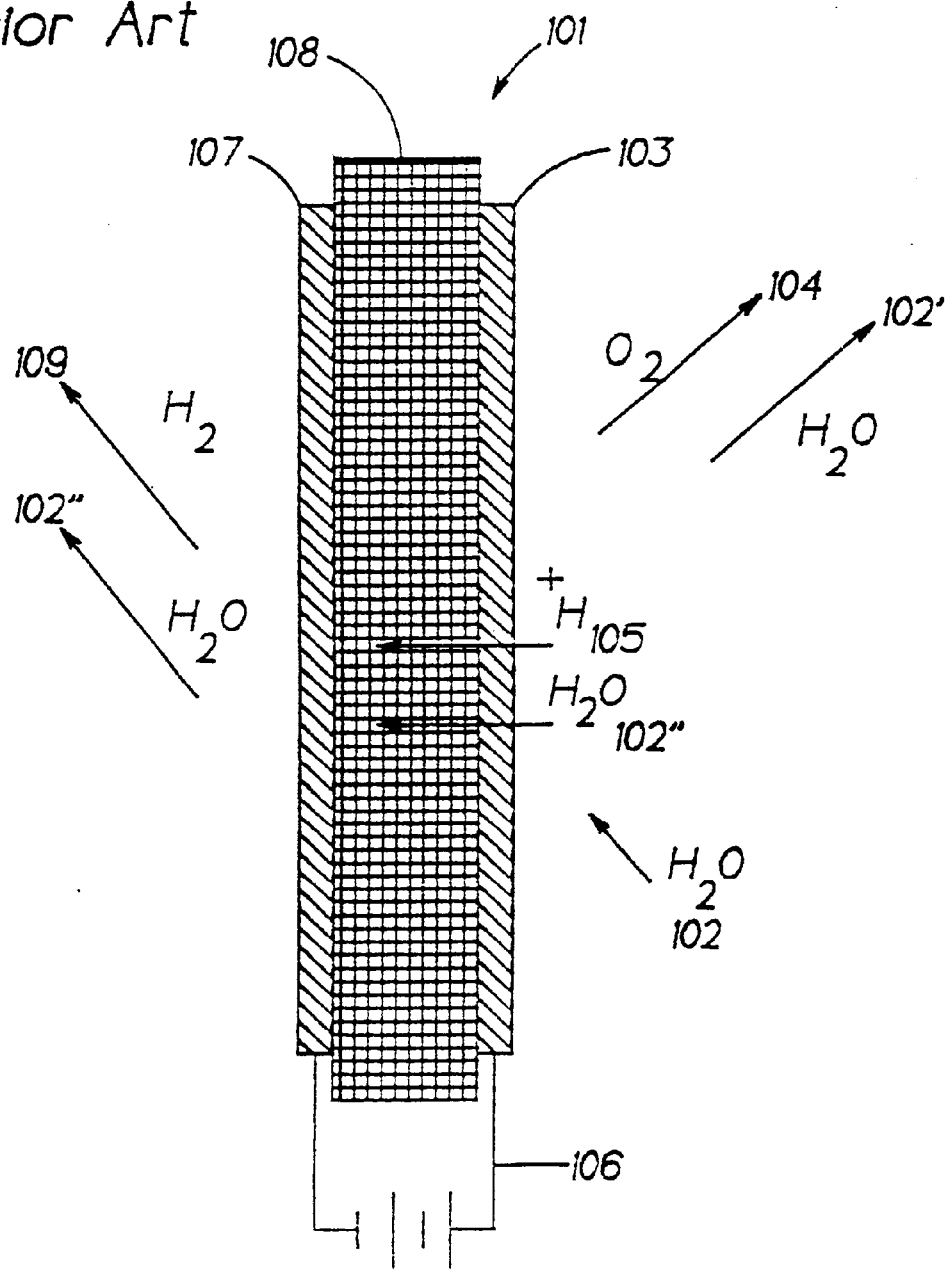
FIG. 1 is a schematic diagram illustrating a prior art electrochemical cell; and, FIG. 2 is a schematic diagram representing a hydrogen generation system for use with an internal combustion engine.

Electrolyzer cell stack 36 comprises a plurality of cells similar to cell 100 described above with reference to FIG. 1 encapsulated within sealed structures (not shown). The reactant water is received by manifolds or other types of conduits (not shown) that are in fluid communication with the cell components. An electrical source compatible with a power source from the internal combustion engine is disposed in electrical communication with each cell within cell stack 36 to provide a driving force for the dissociation of the water.

Oxygen and water exit cell stack 36 via a common stream through valve 37 and are separated in phase separator 38. Ultimately the water is returned to the drain line 23, whereby the water is recycled and the oxygen is released to the atmosphere via vent 39. Optionally, the oxygen may be returned back to the internal combustion engine to assist in enhancing combustion.

The hydrogen stream, which contains water, exits cell stack 36 and is fed to a phase separation/storage vessel 38, which acts as a hydrogen/water separation apparatus 44 and a storage vessel for holding the hydrogen until it is required by the internal combustion engine. Preferably, the vessel 38 is integral with the electrolyzer cell 36. However, the phase separation and storage may be accomplished by separate devices and be located remote from the electrolyzer cell 36 depending on the needs of the application. If a non-pressurized device is desired, the hydrogen can be stored as a solid, e.g., as a metal hydride, in a carbon based storage (e.g. particulates, nanofibers, nanotubes, or the like), and others, as well as combinations comprising at least one of the foregoing storage forms. The storage capacity is preferably at least 1 g of $H_2$ gas, but may be anywhere from 0.25 g to about 10 g. This hydrogen stream has a pressure that is preferably about 300 pounds per square inch (psi), but which may be anywhere from about 1 psi to about 1000 psi. Some water is removed from the hydrogen stream at vessel 38 and may be returned to the electrolyzer via manifolds (not shown).

The hydrogen gas exits the vessel 38 through backpressure regulator 42 and enters the internal combustion engine systems via line 46. A relief valve 44 is coupled to line 46 to vent $H_2$ gas to the atmosphere in the event that pressure in line 46 reached undesirable levels.

All the valves, pumps and sensors are interfaced with a control system 40. Control system 40 is a suitable electronic device capable of accepting data and instructions, executing the instructions to process the data, and presenting the results. Therefore, control system 40 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a scientific calculator, or a hybrid of any of the foregoing.

In addition to being coupled to one or more components within system 10, control system 40 may also be coupled to external computer networks such as a Vehicle control system or an engine emission control system. These external systems are configured to communicate with control system 40 using a well-known computer communications protocol such as TCP/IP (Transmission Control Protocol/Internet Protocol), RS-232, ModBus, and the like.

During operation, the exhaust from the internal combustion engine is routed through the pipe 13 and the venturi 14. Due to well known pressure effects of the venturi, a low pressure zone is created at the beginning of the venturi. Since return line 26 is coupled to the venturi at this low pressure zone, the pressure differential will cause gas to flow through line 15 either from the air inlet 16 or the exhaust pipe upstream from the venturi. While the exhaust gas may have a consistant humidity level, typically 3% relative humidity (R.H.), the ambient air may vary from as low as 10% R.H. to as high as 100% R.H. Since ambient air may have a higher moisture content than the exhaust gases, it is preferable to have the dew point sensor 25 detect the R.H. humidity of the ambient air and have the control system determine when it would require less condenser energy to condensate water vapor from the ambient air instead of the exhaust. Once the appropriate source has been determined, the valve 27 is actuated to flow either exhaust gas or ambient air into the condenser 18. Water which is removed from the air or exhaust is then stored in the reservoir 22 until it is needed by the electrolysis cell 36. As the hydrogen is depleted from the vessel 38, additional reactant water is drawn by the pump 30 through the polisher 32 and into the electrolysis cell 36. The check valve 34 is provided to prevent back flow of the water from the electrolysis cell 36 into the polisher.

In the electrolysis cell 36, hydrogen and oxygen are disassociated. The hydrogen flows into the vessel 38 replenishing the hydrogen used by the engine and the water oxygen combination exit the cell 36 through valve 37 to a phase separator. The valve 37 which is operated by the control system 40 is opened and closed to maintain the appropriate water level inside the cell. The oxygen gas is removed from the water and release to the atmosphere via vent 39. The excess water returns via line 41 to be recycled through the pump 30 and polisher 32.

As hydrogen gas is required by the internal combustion engine, the regulator releases hydrogen for use by the engine via line 46. Preferably the engine will consume hydrogen at a rate of at least 1.1 mg/sec at 300 psi.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A system for generating hydrogen from an exhaust stream from an internal combustion engine, the system comprising:
    a venturi in fluid communication with an exhaust stream;
    a condenser in fluid communication with said venturi, said condenser extracting water from said exhaust stream;
    an electrolyzer in fluid communication with said condenser, said electrolyzer producing hydrogen gas; and,
    a fluid reservoir for storing said water, said reservoir in fluid communication with said condenser and said electrolyzer, wherein said fluid reservoir is in fluid communication with said venturi, said reservoir fluid communication with said venturi generating gas flow from said reservoir to said venturi.

2. The system of claim 1 further comprising a polisher in fluid communication with said reservoir and said electrolyzer.

3. The system of claim 2 further comprising a gas storage vessel in fluid communication with said electrolyzer opposite said polisher.

4. The system of claim 3 wherein said gas storage vessel is integral with said electrolyzer.

5. The system of claim 3 wherein said gas storage vessel holds hydrogen.

6. The system of claim 5 wherein said gas storage vessel contains metal hydrides.

7. The system of claim 5 wherein said gas storage vessel contains nanofibers or nanotubes.

8. The system of claim 4 further comprising a phase separator in fluid communication with said electrolyzer, said phase separator removing water from hydrogen gas.

9. The system of claim 8 wherein said phase separator is integral with said electrolyzer.

10. The system of claim 8 further comprising a reserve reservoir in fluid communication with said fluid reservoir.

11. The system of claim 3 wherein said electrolyzer is in fluid communication with the internal combustion engine.

12. The system of claim 2 wherein said polisher includes activated carbon and a mixed resin ion exchange bed to remove contaminants from said water.

13. The system of claim 1 wherein said electrolyzer utilizes a proton exchange membrane to separate the hydrogen from the oxygen.

14. The system of claim 1 wherein said condenser is a thermo-electric cooler.

15. A system for generating hydrogen for use with an internal combustion engine, the system comprising: an exhaust venturi;
    an air inlet in fluid communication with said venturi and ambient air;
    a condenser in fluid communication with said venturi and said air inlet, said condenser extracting water from said ambient air; and,
    an electrolyzer in fluid communication with said condenser, said electrolyzer producing hydrogen gas;
    a reservoir, said reservoir being in fluid communication with said condenser and said venturi; and,
    a polisher, said polisher in fluid communication with said reservoir and said electrolyzer, wherein said polisher includes activated carbon and a mixed resin ion exchange bed to remove contaminants from said water.

16. The hydrogen generating system of claim 15 further comprising a phase separator, said phase separator in fluid communication with said electrolyzer.

17. The hydrogen generating system of claim 16 wherein said phase separator is integral with said electrolyzer.

18. The hydrogen generating system of claim 16 further comprising a gas storage vessel in fluid communication with said phase separator.

19. The hydrogen generating system of claim 18 wherein said gas storage vessel is integral with said phase separator.

20. The hydrogen generating system of claim 18 wherein said gas storage vessel contains metal hydrides.

21. The hydrogen generating system of claim 18 wherein said gas storage vessel contains nanofibers or nanotubes.

22. The hydrogen generating system of claim 18 wherein said condenser is a thermo-electric cooler.

23. The hydrogen generating system of claim 19 wherein said electrolyzer includes a proton exchange membrane.

24. The hydrogen generating system of claim 18 further comprising a reserve reservoir in fluid communication with said reservoir.

25. The hydrogen generating system of claim 18 further comprising a sensor coupled to said air inlet for determining properties of said ambient air.

26. The hydrogen generating system of claim 25 wherein said sensor is a dew point sensor.

27. The hydrogen generating system of claim 26 wherein said sensor measures ambient temperature and relative humidity.

28. The hydrogen generating system of claim 25 including a valve in fluid communication with said venturi, said air inlet and said condenser.

29. The hydrogen generating system of claim 28 further comprising means for determining required condenser energy, said means operably connected to said said sensor and said valve.

30. The hydrogen generating system of claim 29 further comprising means for operating said valve in response to said condenser energy means.

31. A system for generating hydrogen for use with an internal combustion engine, the system comprising:
a means for condensating water from a gas;
a means for storing said condensated water, said storage means coupled to said condensating means;
a means for electrolyzing said stored condensated water; and,
a means for storing said hydrogen gas;
a gas inlet means, said gas inlet means including an ambient air inlet and a exhaust gas inlet; and,
a means for determining required condenser energy, said determining means coupled to said inlet means.

32. The hydrogen generating system of claim 31 further comprising a means for providing a reserve reservoir.

33. The hydrogen generating system of claim 32 wherein said reserve reservoir contains windshield wiper fluid.

34. The hydrogen generating system of claim 31 wherein said gas storage means is a metal hydride.

35. The hydrogen generating system of claim 31 wherein said gas storage means is a nanofiber or a nanotube.

36. A system for generating hydrogen, said system comprising:
an internal combustion engine;
an exhaust pipe coupled to said internal combustion engine;
an air inlet in fluid communication with said exhaust pipe;
a condenser in fluid communication with said exhaust pipe and said air inlet; and,
an electrolyzer in fluid communication with said condenser; and,
a valve coupled to said exhaust pipe, said air inlet and said condenser.

37. The hydrogen generating system of claim 36 further comprising an air sensor coupled to said air inlet.

38. The hydrogen generating system of claim 37 further comprising a means for determining condenser energy coupled to said valve and said sensor.

39. The hydrogen generating system of claim 38 further comprising a reserve reservoir in fluid communication with said reservoir.

40. The hydrogen generating system of claim 39 wherein said reserve reservoir contains a fluid composed of water and methanol.

41. The hydrogen generating system of claim 39 wherein said reserve reservoir contains a fluid composed of water and ethylene-glycol.

42. The hydrogen generating system of claim 40 further comprising a gas storage vessel in fluid communication with said electrolyzer.

43. The hydrogen generating system of claim 42 wherein said gas storage vessel contains metal hydrides.

44. The hydrogen generating system of claim 42 wherein said gas storage vessel contains nanofibers or nanotubes.

45. A method for generating hydrogen for use with an internal combustion engine comprising the steps of:
generating pressure using an exhaust pipe from an internal combustion engine;
detecting the dew point of ambient air;
determining the appropriate gas which would minimize condenser energy;
condensating reactant water from said gas; and,
generating hydrogen from said reactant water.

46. The method of generating hydrogen of claim 45 wherein said gas is exhaust gas.

47. The method of generating hydrogen of claim 45 wherein said gas is ambient air.

48. The method of generating hydrogen of claim 45 further comprising the step of flowing said gas through a condenser.

49. The method of generating hydrogen of claim 48 further comprising the step of storing said reactant water.

50. The method of generating hydrogen of claim 49 further comprising the step of polishing said reactant water to remove contaminants.

51. The method of generating hydrogen of claim 50 further comprising the step of separating oxygen from said reactant water.

52. The method of generating hydrogen of claim 50 further comprising the step of regulating the flow of hydrogen to the internal combustion engine.

* * * * *